United States Patent Office 3,284,544
Patented Nov. 8, 1966

3,284,544
SELF-EXTINGUISHING ALKENYL AROMATIC RESINS CONTAINING ORGANIC POLYSULFIDE
Jacob Eichhorn, Midland, Mich., assignor to The Dow Chemical Company, Midland, Mich., a corporation of Delaware
No Drawing. Filed Apr. 1, 1963, Ser. No. 269,740
6 Claims. (Cl. 260—893)

This invention relates to self-extinguishing alkenyl aromatic resins containing a halide as a flameproofing agent. More particularly, it concerns the use of an organic disulfide in the resin to enhance the flameproofing properties of the halide.

Alkenyl aromatic resins are highly flammable and cannot be used where this property might present a hazardous condition. Flameproofing agents such as halides of chlorine and bromine are frequently added to these resins for the purpose of reducing their flammability, however the physical properties of these resins sometimes are affected substantially by these halides. The halide usually acts as a diluent and reduce properties such as the tensile strength and/or heat distortion temperature. Also the halides may undergo some decomposition when the plastic is exposed either to actinic light or to an elevated temperature of the magnitude which may be experienced in molding operations as well as in the routine use of the finished plastic article. Such decomposition usually causes polymer breakdown as well as discoloration of the plastic. This is obviously undesirable in clear or transparent resins. Another problem is that thermal decomposition of the halide during molding operations usually produces a corrosion problem with the expensive molding equipment. To avoid or minimize these problems it is desirable to use as little halide as possible to produce the desired flameproofing properties.

One standard of flammability is the ability of the burning resin to become extinguished after it has been ignited by a flame. The self-extinguishing additives break down at the flame temperature and produce hydrogen bromide, in the case of a bromine-containing halide, which extinguishes the flame. Thus, the self-extinguishing property is determined by holding a specimen of the resin in a flame until it ignites then removing it from the flame and observing the length of time required for the flame to extinguish.

According to this invention the flameproofing properties of halides used to prepare self-extinguishing resins of alkenyl aromatic polymers are enhanced substantially by intimately incorporating an organic disulfide with the polymer and halide. A quantity of the halide less than that normally required for a self-extinguishing resin can be used in combination with the disulfide to produce a resin having a low self-extinguishing time. Thus, the disulfide provides flameproofing at a lower halide content, thereby reducing the undesirable properties normally produced by the halogen in a self-extinguishing resin. Among the disulfides which have been found to be effective adjuvants are benzyl disulfide, xylyl disulfide, butylxanthic disulfide, benzothiazole disulfide, as well as polydisulfides such as dithio bis[bis(p-tert.-amylphenol)-disulfide.]

These disulfides have been used in the past as chain transfer agents in the polymerization of styrene to prevent the formation of extremely long polymer chains, thereby producing lower molecular weight polymers. The relative effectiveness of these agents has been designated as the transfer constant in styrene polymerization, with those agents having the higher constants being the more effective. These transfer constants are discussed by C. Walling, "Free Radicals in Solution," John Wiley & Sons, New York (1957), pages 148–160. In general the disulfides having transfer constants greater than about 0.6 at 50° C. are suitable adjuvants for the flameproofing halides. An exception to this generalization is benzyl disulfide which has a coefficient of only 0.03 at 50° C. yet enhances the flameproofing properties of the halides.

Alkenyl aromatic resins which may be flameproofed according to this invention includes the homopolymers of styrene, α-methyl styrene, ethyl styrene, isopropyl styrene, tert.-butyl styrene, chlorostyrene, vinyl toluene, and vinyl xylene as well as copolymers of these monomers or with other vinyl compounds such as acrylonitrile. Additionally, the high impact resins containing about 5–20 weight percent of a rubbery polymer such as GR–S or polybutadiene may be flameproofed in this manner.

Table I lists the results of tests which demonstrate the ability of these chain transfer agents to enhance the self-extinguishing properties of polystyrene. The concentrations of the disulfide and acetylene tetrabromide (ATB) are expressed in parts per hundred parts resin (phr.). The self-extinguishing (S.E.) times were obtained by observing the number of seconds required for a resin specimen measuring ⅛ inch by ½ inch by about 3–5 inches long to extinguish after withdrawal from a flame used to ignite the sample. The times listed in Table I are the averages of several samples which were tested.

TABLE I

*Self-extinguishing times of polystyrene containing acetylene tetrabromide and organic polysulfide*

| Disulfide | Phr. | ATB, phr. | S.E. Time, Seconds |
|---|---|---|---|
| None | | 2.5 | Burns |
| Do | | 3.0 | 8 |
| Xylyl disulfide | 1 | 2 | 2 |
| Benzothiazole disulfide | 1 | 2 | 2.1 |
| Butylxanthic disulfide | 1 | 2 | 1.2 |
| Benzyl disulfide | 1 | 2 | 6.6 |
| Dithio bis[bis(p-tert.-amylphenol) disulfide] | 1 | 2 | 8.0 |
| Do | 2 | 2 | <1 |
| Poly(p-tert.-amylphenol disulfide) | 1 | 2 | 1.8 |

These data show two things. One is that polystyrene containing 2.5 parts of the halide is not self-extinguishing whereas resin containing only two parts halide in combination with one part of the adjuvant is self-extinguishing. The other thing shown is that resin which contains three parts halide without an adjuvant is self-extinguishing whereas resin having a total of three parts of the flameproofing mixture consisting of two parts ATB and one part disulfide has a lower self-extinguishing time in all samples with the exception of that containing dithio-bis[bis(p-tert.-amylphenol)disulfide] which was equal. The data further show that two parts of this adjuvant in combination with two parts of the halide provides a self-extinguishing time of less than one second. Thus, these adjuvants provide low self-extinguishing times at a substantial reduction in the halide content of the resin over that required in the absence of the adjuvant.

The polydisulfide appearing last in the table is similar to the one immediately above it, the difference being that the former contains more p-tert.-amylphenol groups in the molecule than the latter. A molecule of the dithiobis[bis-(p-tert.-amylphenol)disulfide] contains four of these groups connected by three disulfide linkages whereas the poly(p-tert.-amylphenol disulfide) contains more than four of these groups connected by disulfide linkages.

The flameproofing agents were incorporated in the polystyrene by a solvent mixing technique wherein the polymer, halide, and adjuvant were dissolved in methyl chloride and thoroughly blended to obtain an intimate mixture. The solvent was then evaporated leaving a porous or foamed resin. Test bars were cut from this material.

The data in Table II illustrate the utility of the disulfides as adjuvants for halides other than acetylene tetrabromide. The disulfide used in all of these tests was poly(p-tert.-amylphenol disulfide). As in Table I the concentrations are in parts per hundred parts resin and the self-extinguishing times are the averages of several measurements. The samples were prepared by the solution mixing technique described above.

TABLE II

*Self-extinguishing properties of polystyrene containing a halide and an organic disulfide*

| Halide | Phr. | Disulfide, phr. | S.E. Time, Seconds |
|---|---|---|---|
| Acetylene tetrabromide | 2.5 | None | Burns |
| Do | 1.5 | 1 | 9.8 |
| Dibromotetrachloroethane | 2 | None | 8 |
| Do | 1.5 | 0.5 | 2.4 |
| Pentabromomonochlorocyclohexane | 2 | None | Burns |
| Do | 1.5 | 0.5 | 5.8 |
| Tris(2,3-dibromopropyl)phosphate | 4 | None | Burns |
| Do | 3 | 1 | 1.8 |
| Tetrachloroethane | 12 | None | Burns |
| Do | 10 | 2 | 3.4 |
| Tris(dichloropropyl)phosphate | 15 | None | Burns |
| Do | 13 | 2 | 1.0 |

From these data it can be seen that this disulfide is an effective adjuvant for halides frequently used in resins as flameproofing agents. Approximately 2–3 parts disulfide per hundred parts resin provide about the maximum enhancement of the flameproofing properties of the halide, even with halides such as tris(dichloropropyl)phosphate, which are effective only at relatively high concentrations. The minimum concentration of the adjuvant which produces a significant improvement in self-extinguishing time is about 0.5 phr.

The utility of the flameproofing agents in other alkenyl aromatic resins is illustrated by the data in Table III. The samples represented by these data also were prepared by the solution mixing technique using acetylene tetrabromide and poly(p-tert.-amylphenol disulfide) as the flameproofing agents. These polymers require a higher concentration of flameproofing agents than the styrene homopolymer.

TABLE III

*Self-extinguishing properties of alkenyl aromatic resins containing acetylene tetrabromide and an organic disulfide*

| Resin | ATB, phr. | Disulfide, phr. | S.E. Time, Seconds |
|---|---|---|---|
| Polystyrene, 93% styrene, 7% acrylonitrile | 5 | None | 16 |
| Do | 4 | 1 | 3.8 |
| Polystyrene, 95% styrene, 5% GR–S | 4 | None | 19 |
| Do | 2 | 1 | 12 |
| Polyvinyltoluene | 8 | None | Burns |
| Do | 6 | 2 | 4.2 |

Another technique which may be used to obtain an intimate mixture of the resin and flame-proofing agents is that of pressurization. This method of mixing is described in my patent, U.S. 3,058,926. According to this method, about 100 parts by weight of polymer granules are placed in about 150 parts by weight of an aqueous solution which may contain a suspending agent, e.g., one weight percent methyl cellulose. The self-extinguishing agents and about 2–10 weight percent of a blowing agent such as normal pentane, if a foamable resin is desired, are also added to the slurry which is then placed in a pressure vessel where it is agitated and heated to a temperature in the range 95–130° C. over a period of 15–45 minutes. The slurry temperature is held at that level for a period up to four hours then gradually lowered to the initial starting temperature so that granules will not foam when the reactor is opened. The polymer then is separated from the slurry and washed to remove suspending agent and other materials coating the granules.

Table IV lists the self-extinguishing times of polystyrene samples which were flameproofed in this manner using acetylene tetrabromide as the halide in combination with various disulfide adjuvants. The pressurization times listed in the table do not include the time required to raise the temperature from room temperature to the pressurization temperature which time was about 20–30 minutes, nor the final cooling time which was approximately 80 minutes.

TABLE IV

*Polystyrene flameproofed by pressurization*

| Disulfide | Phr. | ATB, phr. | Pressurization | | S.E. Time, Seconds |
|---|---|---|---|---|---|
| | | | Temp., °C. | Time, Hr. | |
| None | | 4 | 95 | 3 | 10 |
| Dithio bis [bis(p-tert.-amylphenol) disulfide] | 2 | 2 | 95 | 4 | 4.8 |
| Poly(p-tert.-amylphenol disulfide) | 2 | 2 | 130 | 1.5 | 1 |
| Benzyl disulfide | 2 | 2 | 95 | 1 | 1.8 |
| Do | 2 | 2 | 130 | 0.5 | 6.2 |

The quantities of flameproofing agents listed in Table IV are the amounts which were added to the pressurization slurry. From about 75 to about 98 percent of these agents were absorbed by the resin, depending upon the conditions of pressurization and the particular agents which were used. This possibly accounts for the fact that a greater amount of the agents are required by this process than by the solvent mixing technique.

Samples of the foamed resin prepared by the solvent mixing technique were pulverized then formed into test strips by pressure molding at 140–148° C. for 1.5 minutes. Samples prepared in this manner which contained one part each of acetylene tetrabromide and poly(p-tert.-amylphenol disulfide) had self-extinguishing times of 10 seconds whereas foamed strips having the same composition were not self-extinguishing. Thus, molded resins having the concentration of flameproofing agents shown to provide self-extinguishing properties for the foamed samples can be expected to have at least equally good properties.

From the foregoing it can be seen that the self-extinguishing time of resins containing a halide as a flameproofing agent can be increased substantially by incorporating from about 0.5 to about 2 parts of an organic disulfide per 100 parts resin. In addition to the disulfides specifically disclosed herein it should be understood that others having a polystyrene chain transfer constant greater than about 0.6 at 50° C. may be used as adjuvants for the flameproofing halides.

I claim:

1. A self-extinguishing alkenyl aromatic resin selected from the group consisting of the homopolymers and copolymers of styrene, α-methyl styrene, tert.-butyl styrene, chlorostyrene, vinyl toluene, vinyl xylene and copolymers thereof with acrylonitrile and such homopolymers and copolymers containing about 5 to 20 weight percent of polybutadiene containing as flameproofing agents an organic halide in combination with an organic disulfide selected from the group consisting of benzyl disulfide, xylyl disulfide, butylxanthic disulfide, benzothiazole disulfide, dithiobis[bis(p-tert.-amylphenol)disulfide] and poly(p-tert.-amylphenol disulfide).

2. A self-extinguishing resin according to claim 1 wherein said disulfide is benzothiazyl disulfide.

3. A self-extinguishing resin according to claim 1 wherein said disulfide is butylxanthic disulfide.

4. A self-extinguishing resin according to claim 1 wherein said disulfide is xylyl disulfide.

5. A self-extinguishing resin according to claim 1 wherein said disulfide is poly(p-tert.-amylphenol disulfide) containing at least 4 p-tert.-amylphenol groups in the molecule.

6. A method of flameproofing a styrene polymer comprising:
dispersing granules of said polymer in an aqueous solution together with a flameproofing quantity of an organic halide and an organic disulfide selected from the group consisting of benzyl disulfide, xylyl disulfide, butylxanthic disulfide, benzothiazole disulfide, dithiobis[bis(p - tert.-amylphenol)disulfide] and poly(p-tert.-amylphenol disulfide),
agitating the resulting dispersion while increasing the temperature thereof to a level in the range 95–130° C. over a period of about 15 to 45 minutes,
continuing to agitate said dispersion while maintaining said increased temperature level for a period of up to three hours, then
decreasing said temperature to approximately room temperature over a period of about 60–80 minutes, thereafter
recovering said polymer granules from said dispersion.

References Cited by the Examiner
UNITED STATES PATENTS

| | | | |
|---|---|---|---|
| 3,001,954 | 9/1961 | Buchholz et al. | 260—2.5 |
| 3,060,121 | 10/1962 | Orloff et al. | 252—48.2 |
| 3,145,176 | 8/1964 | Knapp et al. | 260—45.95 |

LEON J. BERCOVITZ, *Primary Examiner.*

M. J. WELSH, *Assistant Examiner.*